Sept. 23, 1924.                    C. H. STANTON ET AL                    1,509,789
                                      SAWING MACHINE
                                   Filed May 18, 1922                2 Sheets-Sheet 2
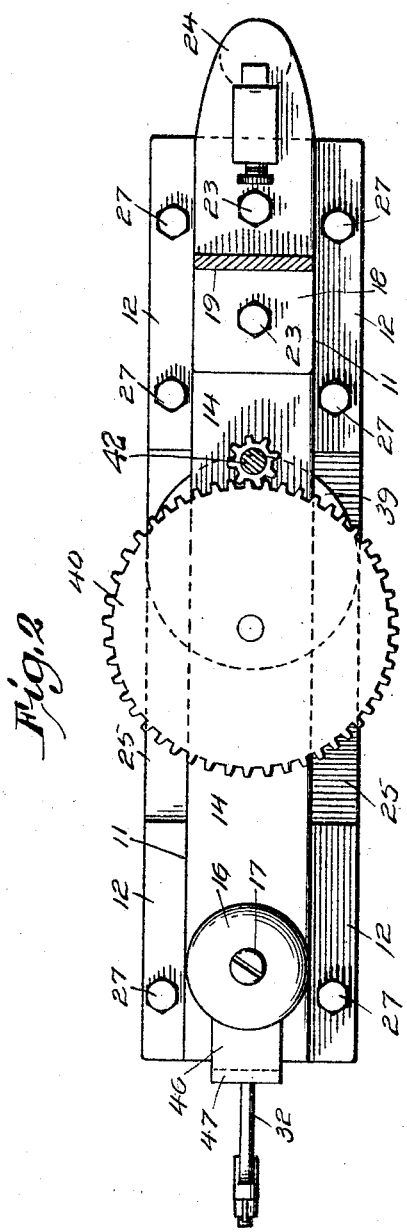
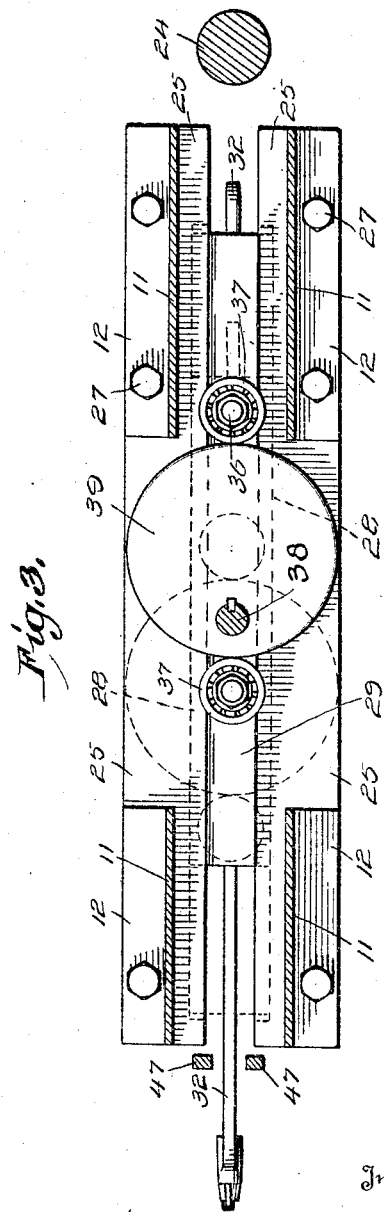
Inventors
Charles H. Stanton and
Elwood C. Dessen
By Geo. F. Kimmel
                Attorney Patented Sept. 23, 1924.

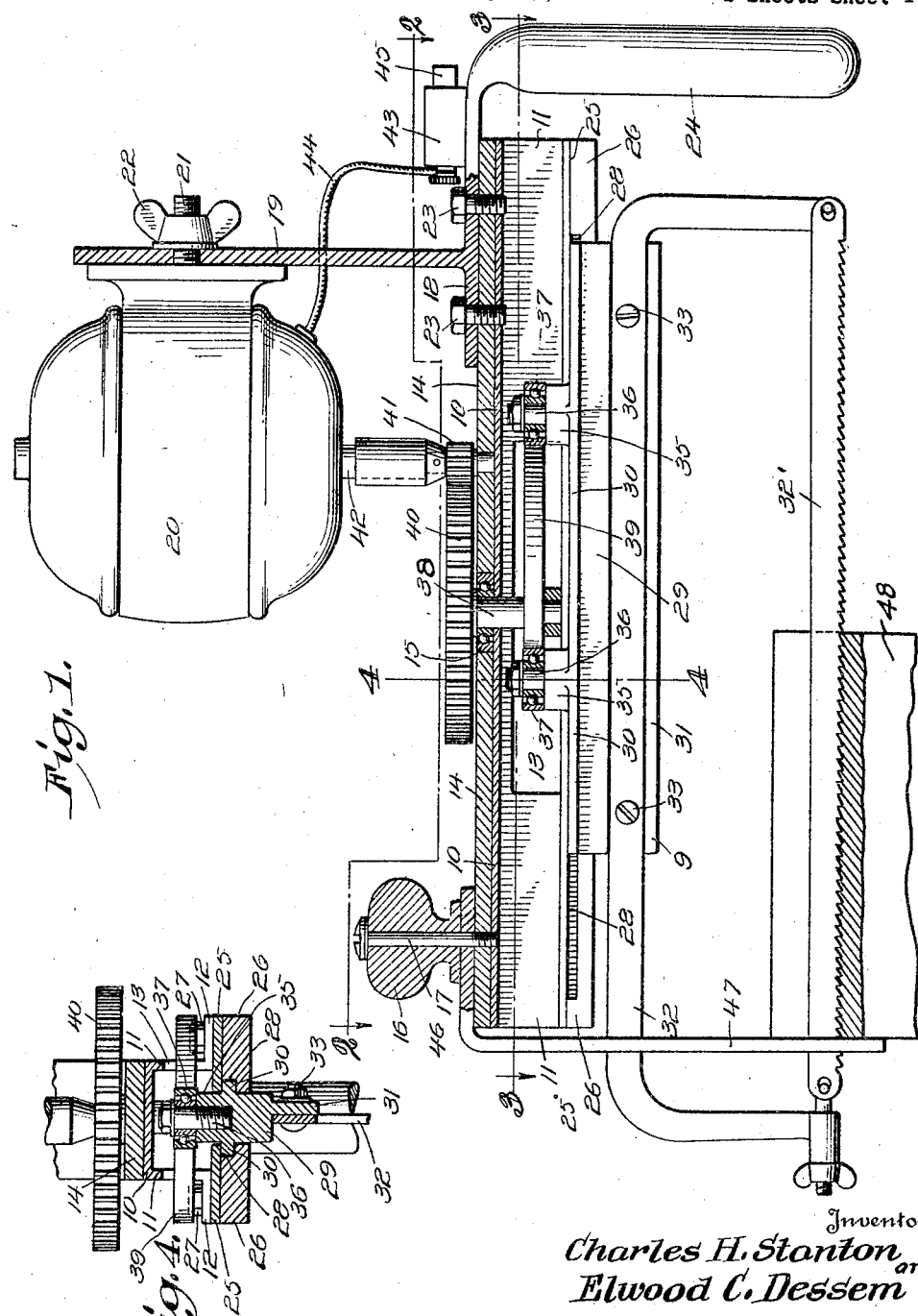

1,509,789

UNITED STATES PATENT OFFICE.

CHARLES H. STANTON, OF CHICAGO, ILLINOIS, AND ELWOOD C. DESSEM, OF WORTHINGTON, MINNESOTA.

SAWING MACHINE.

Application filed May 18, 1922. Serial No. 561,922.

*To all whom it may concern:*

Be it known that we, CHARLES H. STANTON and ELWOOD C. DESSEM, citizens of the United States, residing, respectively, at Chicago, in the county of Cook and State of Illinois, and Worthington, Nobles County, Minnesota, have invented certain new and useful Improvements in Sawing Machines, of which the following is a specification.

This invention relates to certain improvements in means for operating hack saws and the like, and has for one of its objects to provide a simply constructed and compactly arranged device to which an ordinary hack saw frame is coupled, and carrying a motor device, preferably electrically operated, whereby the reciprocating motion is imparted to the saw frame and the saw carried thereby.

With these and other objects in view the invention consists in certain novel features of construction as hereinafter described and then specifically pointed out in the claims, and in the drawings illustrative of the preferred embodiment of the invention:—

Figure 1 is a longitudinal sectional elevation of the improved device.

Fig. 2 is a plan view with parts in section on the line 2—2 of Fig. 1.

Fig. 3 is a plan view with the parts in section on the line 3—3 of Fig. 1.

Fig. 4 is a detail in section on the line 4—4 of Fig. 1.

The improved device includes a supporting structure comprising a housing member formed of an upper horizontal portion 10 and depending side portions 11 at the ends and with flanges 12 extending laterally from the depending portions, thus leaving open spaces, 13 intermediate the sides 11, as shown.

Bearing upon the upper portion 10 of the housing is a bearing plate 14 having a relatively large opening intermediate the ends to receive a ring bearing 15, the latter having an annular anti-friction ball race.

A hand grip 16 is secured to the bearing member 14 by a pin 17 tapped through the members 14 and 10, as shown in Fig. 1.

The pin 17 thus operates not only to hold the hand grip in position but likewise binds the portions 10 and 14 together at one end.

Bearing upon the member 14 at the end opposite to the hand grip 16 is a base portion 18 of a standard 19, the latter adapted to support an electric motor, represented conventionally at 20, by a clamp screw 21 and wing nut 22.

The base portion 18 of the bracket is secured to the member 14 by cap screws 23, which are tapped into portion 10 at the end opposite to the handle 16. By this means the parts 14, 10 and the motor supporting bracket 18 and 19 are firmly united.

The base portion 18 of the bracket is extended into a hand grip 24.

Attached to the lower faces of the flange portions 12 are superposed plates 25 and 26, the three portions 12, 25 and 26 being firmly connected by cap screws 27, as shown.

The confronting edges of the members 26 are formed with longitudinal guideways 28 over which the confronting edges of the members 25 extend, as shown in Fig. 4.

A saw supporting member or head indicated as a whole at 29 is movably disposed between the confronting edges of the members 25 and 26, and provided with lateral ribs 30 extending into the guideways 28. The saw supporting member 29 with its ribs 30 is thus slidable between the members 26 and its movement controlled by the coaction of the ribs 30 and guideways 28. Extending from the lower face of the support 29 is a rib 31 to which the hack saw, represented conventionally at 32, is attached, for instance by bolts 33.

Rising from the upper face of the saw supporting member 29 are spaced lugs 35 having studs 36 rising therefrom, and mounted for rotation on each of the studs is a ring roller 37 with a ball bearing to decrease the friction. Mounted on a vertical stub shaft 38 which extends through the opening in the member 14, and supporting a suitable ball bearing in the collar 15, is a cam disk 39 in constant engagement with the rollers 37.

The stub shaft 38 extends above the member 14 and is provided with a gear wheel 40, the latter operative by a pinion 41 on the shaft 42 of the motor 20.

By this arrangement it will be obvious that the motion of the motor 20 will be communicated to the cam 39 and the motion of the latter utilized to reciprocate the supporting member 29 and the saw carried thereby.

The saw can be held to its work by the operator grasping the grip members 16 and 24, as will be obvious.

A guard device is provided and comprises a horizontal portion 46 extending over the outer face of the member 14 and apertured to receive the pin 17, and a longitudinally slotted portion 47 through which the saw support 32 and the saw 32' extends, as shown.

The guard thus serves to hold the member being operated on, and indicated at 48, against longitudinal movement of the saw in one direction, and is an important and essential feature of the improved device.

A suitable switch device indicated conventionally at 43, is mounted on the bracket 18 and connected by a suitable conductor means indicated at 44 with the motor, the switch including a push button 45 to control the electric current passing through the switch.

The improved device is simple in construction, can be employed for severing metal, wood, or other material and may be employed to advantage wherever an ordinary hack saw is employed.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. In a device of the class described a supporting frame including spaced side members having longitudinal guideways in their confronting faces, a saw carrier having lateral ribs engaging in said guideways and depending below the line of said frame and adapted to support a saw from said depending portion, spaced studs rising from said saw carrier, a stub shaft mounted in said frame above the saw carrier, a cam device carried by said stub shaft and operating between said studs, and means for rotating said stub shaft and the cam device carried thereby to impart reciprocating movement to said saw carrier.

2. In a device of the class described a supporting frame including spaced side members having longitudinal guideways in their confronting faces and a longitudinally directed housing enclosing the side members, a saw carrier having lateral ribs engaging in said guideways and depending below the line of said frame and adapted to support a saw from said depending portion, spaced studs rising from said saw carrier, a stub shaft mounted in said housing, a cam device carried by said stub shaft and operating between said studs, and means for rotating said stub shaft and the cam device carried thereby to impart reciprocating movement to said saw carrier.

3. In a device of the class described a supporting frame including spaced side members having longitudinal guideways in their confronting faces and a longitudinally directed housing enclosing the side members, a saw carrier having lateral ribs engaging in said guideways and depending below the line of said frame and adapted to support a saw from said depending portion, spaced studs rising from said saw carrier, a stub shaft mounted in said housing, a cam device carried by said stub shaft and operating between said studs, a bracket attached to said housing, a motor device supported on said bracket and including a driven shaft, a pinion on said motor shaft, and a gear on said stub shaft engaged by said pinion, and means for rotating said stub shaft and the cam device carried thereby to impart reciprocating movement to said saw carrier.

In testimony whereof, we affix our signatures.

CHARLES H. STANTON.
ELWOOD C. DESSEM.